United States Patent [19]
Gilbertsen et al.

[11] Patent Number: 5,701,486
[45] Date of Patent: Dec. 23, 1997

[54] TRACING TECHNIQUE FOR APPLICATION PROGRAMS USING PROTECT MODE ADDRESSING

[75] Inventors: Todd Andrew Gilbertsen; Stephen Arthur Knight, both of Rochester, Minn.

[73] Assignee: International Business Machines Corporation, Armonk, N.Y.

[21] Appl. No.: 164,665

[22] Filed: Dec. 8, 1993

Related U.S. Application Data

[63] Continuation of Ser. No. 501,983, Mar. 29, 1990, abandoned.

[51] Int. Cl.[6] ............................................. G06F 11/30
[52] U.S. Cl. ...................... 395/704; 395/681; 395/651; 395/413
[58] Field of Search ....................... 395/681, 651, 395/413, 704, 700

[56] References Cited

U.S. PATENT DOCUMENTS

| | | | |
|---|---|---|---|
| 4,142,232 | 2/1979 | Harvey | 364/200 |
| 4,347,565 | 8/1982 | Kaneda et al. | 364/200 |
| 4,376,297 | 3/1983 | Anderson et al. | 364/200 |
| 4,459,661 | 7/1984 | Kaneda et al. | 364/200 |
| 4,524,415 | 6/1985 | Mills, Jr. et al. | 364/200 |
| 4,538,241 | 8/1985 | Levim et al. | 364/900 |
| 4,598,364 | 7/1986 | Gum et al. | 395/183.14 |
| 4,774,659 | 9/1988 | Smith et al. | 364/200 |
| 4,803,423 | 2/1989 | Boutigny | 324/130 |
| 4,811,276 | 3/1989 | Suga | 364/200 |
| 5,274,811 | 12/1993 | Borg et al. | 395/704 |
| 5,412,798 | 5/1995 | Garney | 395/500 |
| 5,459,867 | 10/1995 | Adams et al. | 395/681 |

OTHER PUBLICATIONS

Coffin, McLean, Raby, Sullivan "Enhanced Collection and Recording of Computer System Hardware/Software Event Trace Data and System Error Data", IBM Technical Bulletin, vol. 22, No. 8, 1985 Jan.
Performance Trace Facility, IBM Technical Disclosure Bulletin, vol. 30, No. 6 Nov. 1987, pp. 296–297.
Advanced OS/2 Programming, Microsoft Press, R. Duncan, 1989, p. 675 "Device Helper Function 'PhysToUVirt'".
Performance Trace Facility, IBM Technical Disclosure Bulletin vol. 30, No. 6 Nov. 1987 pp. 296–297.
Virtual Address Monitoring Technique, IBM Technical Disclosure Bulletin vol. 19, No. 12 May 1977 pp. 4625–4626.

*Primary Examiner*—Kevin A. Kriess
*Attorney, Agent, or Firm*—Curtis G. Rose; Owen J. Gamon

[57] ABSTRACT

A tracing technique is disclosed for an application program that is only permitted to access virtual storage, not physical storage, via a Protect Mode Addressing scheme. The application program contains an initialization statement that initializes a trace address T1 to be equal to a virtual address V1 contained in a data area under the control of the application program. A statement in the application program then requests a pinned virtual address V2 that maps to a predetermined physical address P from a device driver. If the device driver exists, the trace address T1=virtual address V2. A memory mapper maps address V2 to physical address P and writes the information to physical address P. A conventional logic analyzer monitors the bus for any writes to physical address P and captures the contents of the bus upon the detection of this condition.

17 Claims, 5 Drawing Sheets

TRACING TECHNIQUE FOR APPLICATION PROGRAMS USING PROTECT MODE ADDRESSING

This a continuation of patent application Ser. No. 07/501,983 filed Mar. 29, 1990, now abandoned.

FIELD OF THE INVENTION

This invention relates to the data processing field. More particularly, this invention provides a technique that enables application programs running in a Protect Mode Addressing environment, such as under OS/2, to generate tracing information detectable by a conventional logic analyzer monitoring a bus for the occurrence of a specific physical address.

BACKGROUND OF THE INVENTION

The first generation of personal computers included relatively simple machines, such as the IBM Personal Computer. Application programs running on these computers were usually executed under the Disk Operating System (DOS). DOS allowed application programs to directly access physical storage. This technique is called "Real Mode Addressing". An application developer could insert simple trace hooks in the logic flow of an application program for debug or performance purposes. These simple trace hooks wrote information to a know physical address. A logic analyzer would capture the contents of the bus upon the occurrence of the known physical address. Such a prior art system is shown in FIG. 1. IBM Technical Disclosure Bulletin Vol. 30, No. 6, November 1987, pp. 296–7 describes such, a prior art technique.

The second generation of personal computers include considerably more COMPLEX machines, such as the IBM Personal System/2. Application programs running on these computers were usually executed under Operating System/2 (OS/2). Unlike DOS, application programs running under OS/2 are not authorized to directly access physical storage. Instead, application programs running under OS/2 or similar operating systems can only access virtual storage. This technique is called "Protect Mode Addressing". These operating systems map virtual storage addresses to physical storage addresses without the knowledge of the application program. This mapping is subject to change at any time at the whim of the operating system unbeknownst to the application program.

While Protect Mode Addressing has some significant advantages over Real Mode Addressing, such as improved integrity, enhanced storage efficiency and dramatically increased storage space, application developers can no longer insert simple trace hooks in the logic flow of an application program for debug or performance purposes that write to a physical address, since application programs running on operating systems using Protect Mode Addressing are not permitted to write to physical addresses.

SUMMARY OF THE INVENTION

It is a principal object of the invention to provide an enhanced tracing technique for application programs.

It is another object of the invention to provide an enhanced tracing technique for application programs that are not allowed to directly write to physical storage.

These and other objects are accomplished by the enhanced tracing technique for application programs disclosed herein.

A tracing technique is disclosed for an application program that is only permitted to access virtual storage, not physical storage, via a Protect Mode Addressing scheme. The application program contains an initialization statement that initializes a trace address T1 to be equal to a virtual address V1 contained in a data area under the control of the application program. A statement in the application program then requests a pinned virtual address V2 that maps to a predetermined physical address P from a device driver. If the device driver exists, it has the authority to convert physical address P to a virtual address V2, and performs this conversion. The device driver tells the operating system that the application program "owns" this virtual address V2, and also prevents the operating system from changing the mapping between P and V2.

The device driver passes the virtual address V2 back to the application program. The application program reinitializes the trace address T1 to be equal to V2. If the device driver didn't exist, trace address T1 would remain virtual address V1.

The application program contains instructions that together perform a specific function, such as word processing, spreadsheet, database, games, etc. Intermixed between these instructions are trace statements. These trace statements contain information to write to the trace address. If the device driver exists, the trace address T1=virtual address V2. A memory mapper maps address V2 to physical address P and writes the information to physical address P. A conventional logic analyzer monitors the bus for any writes to physical address P and captures the contents of the bus upon the detection of this condition. In this manner, an application program that is not permitted to directly access physical memory can still contain trace statements for debug and performance monitoring purposes.

If the device driver does not exist, trace address T1 remains equal to virtual address V1, which is in a data area under the control of the application program. Therefore, when the trace statements are encountered, the information contained in the trace statements is harmlessly and quickly written to virtual address V1 without significant performance degradation while still keeping all path lengths equal.

DESCRIPTION OF THE PREFERRED EMBODIMENT

Figure 1:
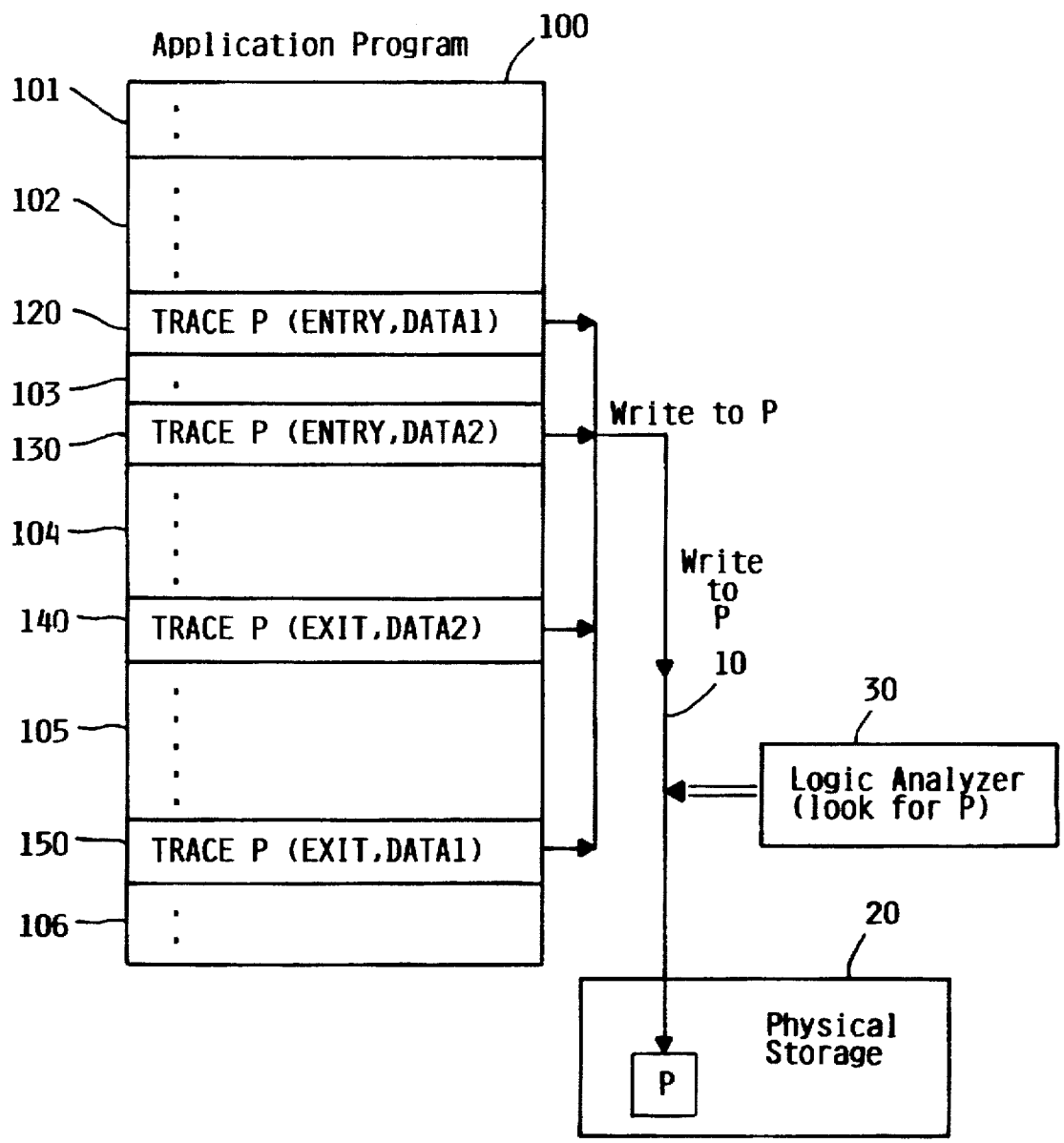
FIG. 1 shows the prior art method of installing simple trace hooks in application programs capable of directly accessing physical storage.

FIG. 1 shows the prior art method of installing simple trace hooks in application program 100. Application program 100 runs under an operating systems with Real Mode Addressing, such as DOS, on a first generation personal computer, such as an IBM Personal Computer, and is capable of directly accessing physical storage. Segments 101–106 of application program 100 are specific to application program 100 and allow it to perform a specific function, such as word processing, spreadsheet, database, games, etc.

Segment 120 is a simple trace hook that writes the information contained in the parameters to physical address P. The write command is placed on system bus 10 to be sent to physical address P in physical storage 20. Logic analyzer 30 has been configured to monitor data bus 10 for the occurrence of a write to physical address P. Upon detecting this event, logic analyzer 30 stores the information contained in the parameters of the trace hook, along with other information such as a timestamp or other system data. Trace hooks 130, 140, and 150 operate in a similar manner.

Figure 2A:
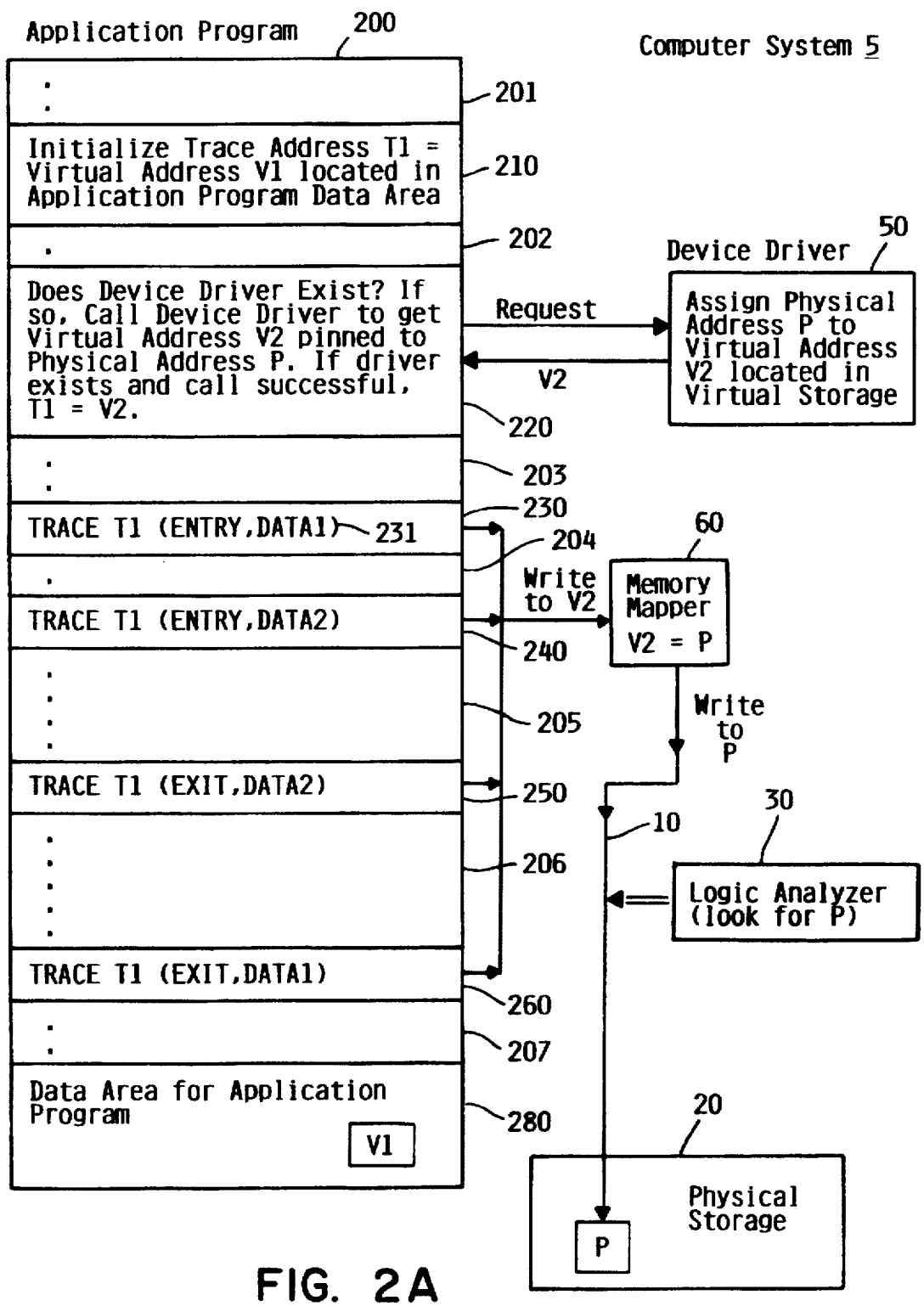
FIG. 2A shows the application program that contains the tracing technique of the invention connected to a device driver, a memory mapper, and a logic analyser so that tracing can occur.

FIG. 2A shows application program 200 of the invention. Application program 200 does not have the authority to access physical storage directly. Instead, application program 200 accesses virtual addresses that are converted by the operating system to physical addresses. Application program 200 operates in computer system 5. In the preferred embodiment, computer system 5 is an IBM Personal System/2 or similar machine running the OS/2 operating system or similar Protect Address Mode operating system. Computer system 5 executes the operating system and application program 200 in a processor, such as an Intel 80386 (not shown). Note that computer system 5 is not limited to the PS/2 or other types of personal computers, nor is it limited to the OS/2 operating system. In fact, this invention has wide applicability to any computer system, such as a mainframe or midrange computer system, in which application programs access virtual addresses.

Segments 201–207 of application program 200 are specific to application program 200 and allow it to perform a specific function, such as word processing, spreadsheet, database, games, etc. Segment 210 initializes a trace address T1 to be equal to a virtual address V1 located in data area 280 of application program 200. Data area 280 is under the control of application program 200.

Segment 220 checks to see if a device driver exists that is authorized to convert a physical address to a virtual address and "pin" these addresses together. If not, T1 remains equal to V1. If the device driver exists, segment 220 calls the device driver by requesting a virtual address that is "pinned" to a physical address from device driver 50. In the preferred embodiment, device driver 50 has been told during the initialization of the computer system that physical address P was available to be pinned to a virtual address. Other embodiments may require segment 220 to pass a physical address P to device driver 50. In either event, Physical address P is contained in physical storage 20, and is usually a "safe place" to direct a write statement to, such as Read Only Memory (ROM) or Read Only Storage (ROS), where a destructive write will not occur but where a logic analyzer can detect the attempted write operation. Device driver 50 is given special authority by the operating system to convert physical address P to a virtual address V2, and performs this conversion. Device driver 50 tells the operating system that the application program "owns" this virtual address V2, and also prevents the operating system from changing the mapping between P and V2. These steps "pin" virtual address V2 to physical address P. In the preferred embodiment, device driver 50 uses a "PhysToUVirt" DevHelp function under OS/2 to pin virtual address V2 to physical address P. The "PhysToUVirt" DevHelp function is explained in more detail on pages 5-1, 5-6, 5-31, and 5-32 of "Operating System/2 Programming Tools and Information Version 1.2: I/O Subsystems and Device Support, Volume 1, Device Drivers", number 64F0282, First edition, Sep. 1989.

Device driver 50 passes the virtual address V2 back to segment 220 of application program 200. Segment 220 reinitializes the trace address T1 to be equal to V2 in segment 220. If the device driver didn't exist, or if the call to the device driver failed, trace address T1 would remain virtual address V1.

As has been discussed, application program 200 contains segments 201–207 that together perform a specific function, such as word processing, spreadsheet, database, games, etc. Intermixed between these segments are trace statements 230, 240, 250, and 260. These trace statements contain information to write to the trace address. When trace statement 230 is executed, the information contained in parameters 231 (ENTRY, DATA1) is written to trace address T1 (set by segment 220 as virtual address V2). Note that there can be more or less than four trace statements in an application program, and these statements can be in a different sequence from that shown in the figures. For example, statement 260 can be between statements 230 and 240, or between statements 240 and 250. If it was desirable to just perform one trace, statements 240 and 250 would not be needed. Memory mapper 60, under the control of the operating system, maps virtual address V2 to physical address P. In the preferred embodiment, memory mapper 60 is an integral part of the processor of computer system 5. The information contained in parameters 231 is then sent via bus 10 to be written to physical address P contained in physical storage 20. Note that if physical address P is in ROM or ROS, data will actually be written to physical address P, but will not be stored in the memory residing at physical address P. The write command travelling on bus 10 will be detected by logic analyzer 30.

Logic analyzer 30 has been configured to monitor bus 10 for the occurrence of a write to physical address P. Upon detecting this event, logic analyzer 30 stores the information contained in the parameters of trace statement 230, along with other information such as a timestamp or other system data. Trace statements 240, 250, and 260 operate in a similar manner. Logic analyzer 30 can be any conventional logic analyzer well known in the art, such as a Tektronics 9201T or a Hewlett-Packard 1610A. Logic analyzer 30 could also be an attachment card connected directly to the PS/2, and could perform specialized functions.

Analysis of the information captured by logic analyzer 30 can provide a user or application developer with important performance or debug information. For example, by subtracting the timestamp value captured when trace statement 250 was executed from the timestamp value captured when trace statement 240 was executed, a user or application developer would know how long it took for segment 205 of application program 200 to be executed. Likewise, by subtracting the timestamp value captured when trace statement 260 was executed from the timestamp value captured when trace statement 230 was executed, a user or application developer would know how long it took for segments 203, 204, 205 and 206 (along with trace statements 240 and 250) of application program 200 to be executed.

Although it is desirable to always have statements 210 and 220, along with trace statements such as 230 existing in application program 200 so that application program 200 can be monitored by logic analyzer 30 at any time without requiring application program 200 to be edited, it is also desirable to allow application program 200 to run normally if logic analyzer 30 and/or device driver 50 is not present.

Figure 2B:
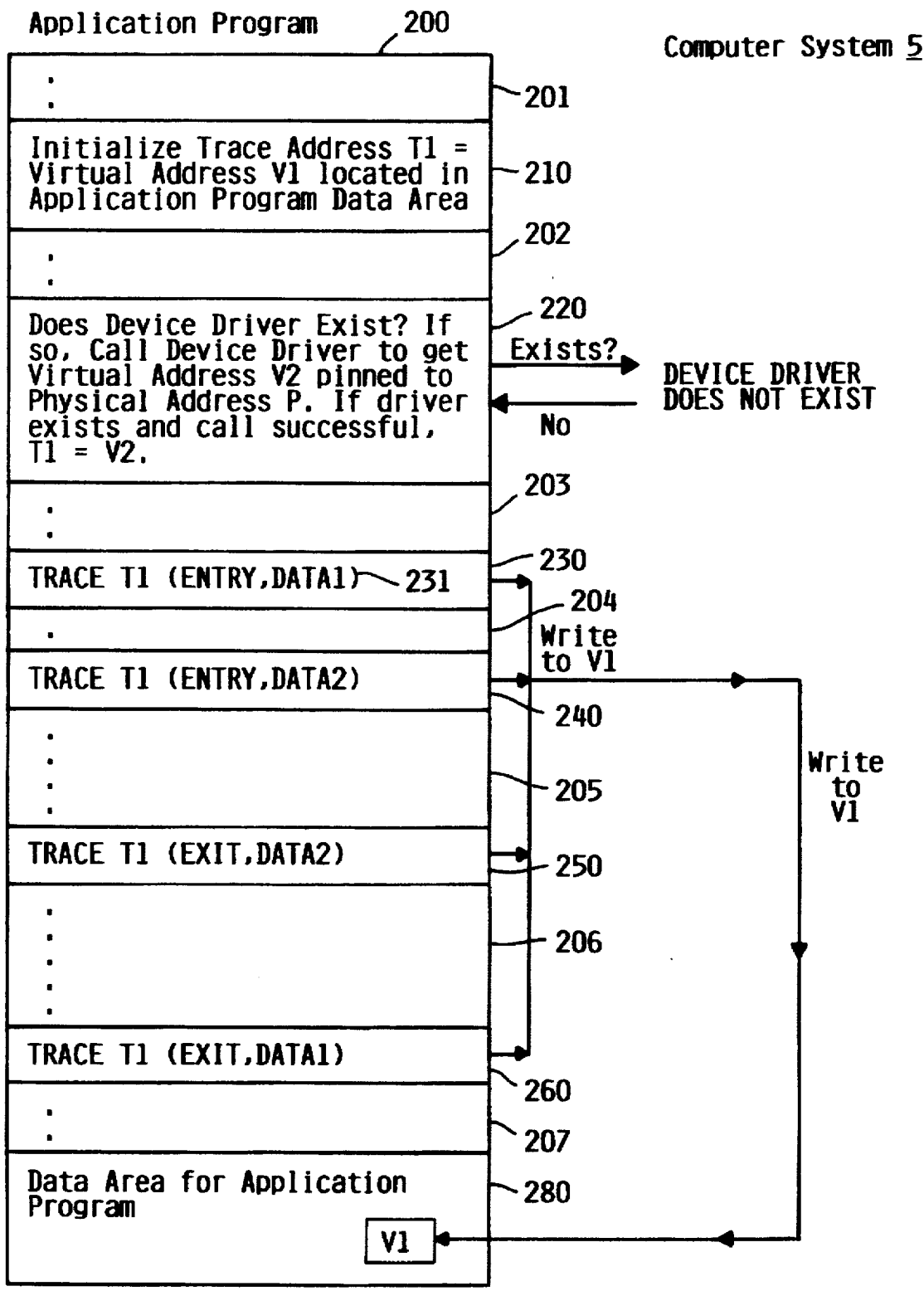
FIG. 2B shows an application program that contains the tracing technique of the invention.

FIG. 2B shows application program 200 operating in computer systems without device driver 50 or logic analyzer 30. Note that application program 200 of FIG. 2B is the same as application program 200 of FIG. 2A. When segment 220 checks to see if a device driver exists, (or if the device driver exists but the call to it fails), it is told by the operating system that the device driver does not exist (or cannot be successfully accessed). Therefore, trace address T1 remains set to virtual address V1 contained in data area 280 of application program 200. When trace segments 230, 240, 250, and 260 are executed, they write their parameter information to virtual address V1 instead of virtual address V2. Since virtual address V1 is contained in a data area under the control of application program 200 and specifically reserved by the application program for this purpose, parameter information 231 from trace segment 230 is harmlessly written to virtual address V1. Subsequent trace segments harmlessly overwrite this same virtual address V1 with their parameter information. The effect of this technique is simply to discard the trace parameters when the device driver does not exist, without affecting the application program itself or application path length.

Figure 3A:
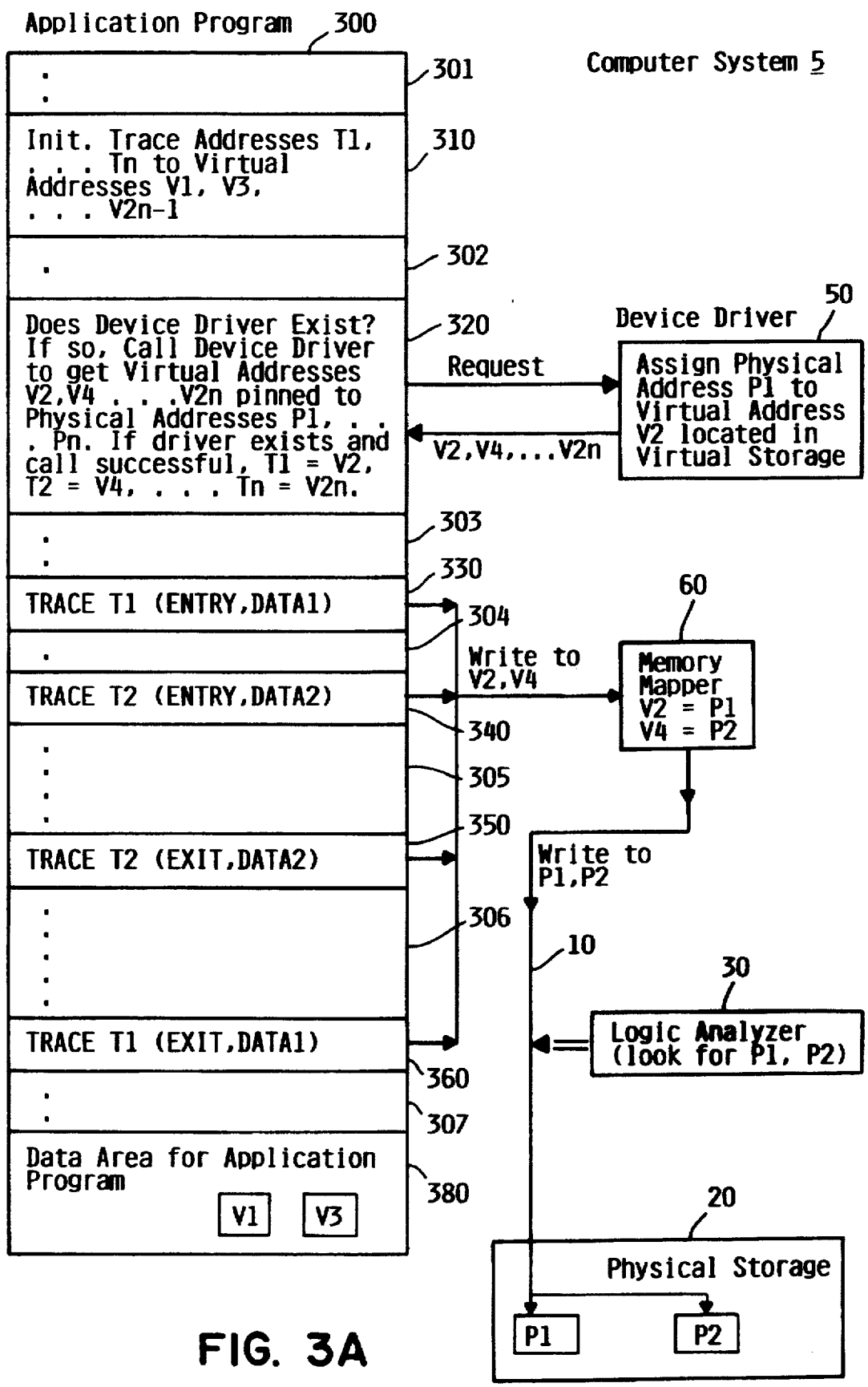
FIG. 3A–3B shows an alternate embodiment of the invention.
Figure 3B:
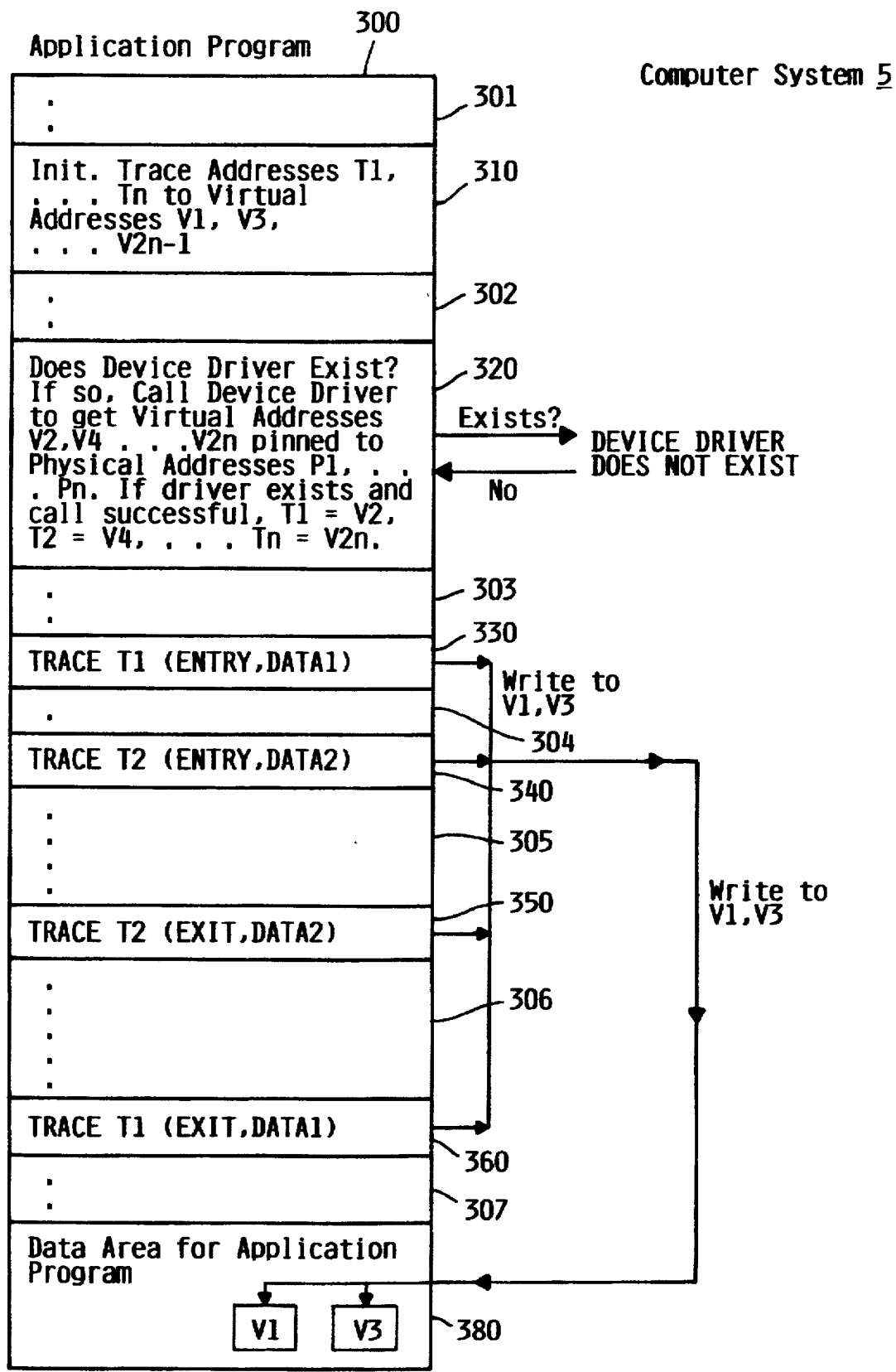

An alternate embodiment has been contemplated for this invention and will now be discussed in conjunction with FIGS. 3A-3B. Segment 310 can initialize a plurality of trace addresses T1, T2, ... Tn, and assign a corresponding plurality of virtual addresses V1, V3, ... V2 n-1 located in data area 280. Segment 320 would then request device driver 50 to assign virtual addresses V2, V4, ... V2n to physical addresses P1, P2, ... Pn. Trace segments 330, 340, 350, and 360 can then send trace information to more than one address. Logic analyzer 30 can be configured to monitor some or all of the addresses. This alternate embodiment allows application program 300 to be traced in a more powerful and flexible manner, thereby providing detailed tracing statistics for analysis.

While this invention has been described with respect to the preferred embodiment and alternate embodiments, it will be understood by those skilled in the art that various changes in detail may be made therein without departing from the spirit, scope and teaching of the invention. Accordingly, the herein disclosed is to be limited only as specified in the following claims.

What is claimed is:

1. An application program for execution on a computer, wherein said computer has virtual storage addresses and physical storage addresses, to provide a tracing technique, said program comprising a computer readable recording medium and a plurality of computer executable instructions recorded thereon, said computer executable instructions comprising:
   initializing means for initializing a trace address equal to a first virtual address contained in a data area under the control of said application program;
   determining means, responsive to said initializing means, for determining whether a device driver exists, wherein said device driver has the capability to convert a first physical address into a second virtual address, and wherein when said device driver exists, said determining means requests said second virtual address from said device driver and reinitializes said trace address to be equal to said second virtual address;
   first writing means, responsive to said determining means, for indicating the beginning of a first trace by writing a first trace data to said trace address; and
   second writing means, responsive to said first writing means, for indicating the end of said first trace by writing a second trace data to said trace address.

2. The application program of claim 1, wherein said determining means further comprises leaving said trace address equal to said first virtual address when said device driver does not exist.

3. The application program of claim 1, further comprising:
   third writing means, responsive to said determining means, for indicating the beginning of a second trace by writing a third trace data to said trace address; and
   fourth writing means, responsive to said third writing means, for indicating the end of said second trace by writing a fourth trace data to said trace address.

4. An application program for execution on a computer, wherein said computer has virtual storage addresses and physical storage addresses, to provide a tracing technique, said program comprising a computer readable recording medium and a plurality of computer executable instructions recorded thereon, said computer executable instructions comprising:
   initializing means for initializing a first trace address equal to a first virtual address contained in a data area under the control of said application program and initializing a second trace address equal to a second virtual address contained in said data area;
   determining means, responsive to said initializing means, for determining whether a device driver exists, wherein said device driver has the capability to convert a first physical address into a second virtual address and a second physical address into a third virtual address, and wherein when said device driver exists, said determining means requests said second virtual address and said third virtual address from said device driver and reinitializes said first trace address to be equal to said second virtual address and reinitializes said second trace address to be equal to said third virtual address;
   first writing means, responsive to said determining means, for indicating the beginning of a first trace by writing a first trace data to said first trace address;
   second writing means, responsive to said first writing means, for indicating the end of said first trace by writing a second trace data to said first trace address;
   third writing means, responsive to said determining means, for indicating the beginning of a second trace by writing a third trace data to said second trace address; and
   fourth writing means, responsive to said third writing means, for indicating the end of said second trace by writing a fourth trace data to said second trace address.

5. The application program of claim 4, wherein said determining means further comprises leaving said first trace address equal to said first virtual address and said second trace address equal to said second virtual address when said device driver does not exist.

6. The application program of claim 4, further comprising:
   fifth writing means, responsive to said determining means, for indicating the beginning of a third trace by writing a fifth trace data to said first trace address;
   sixth writing means, responsive to said fifth writing means, for indicating the end of said third trace by writing a sixth trace data to said first trace address;
   seventh writing means, responsive to said determining means, for indicating the beginning of a fourth trace by writing a seventh trace data to said second trace address; and
   eighth writing means, responsive to said seventh writing means, for indicating the end of said fourth trace by writing a eighth trace data to said second trace address.

7. A computer system having a processor, a bus, physical storage, virtual storage addresses, and physical storage addresses, said computer system further comprising:

an application program that provides a tracing technique when executed by said processor, further comprising:

initializing means for initializing a trace address equal to a first virtual address contained in a data area, wherein said data area is under the control of said application program;

determining means, responsive to said initializing means, for determining whether a device driver exists, wherein said device driver has the capability to convert a first physical address contained in said physical storage into a second virtual address, and wherein when said device driver exists, said determining means requests said second virtual address from said device driver and reinitializes said trace address to be equal to said second virtual address;

first writing means, responsive to said determining means, for indicating the beginning of a first trace by writing a first trace data to said trace address; and second writing means, responsive to said first writing means, for indicating the end of said first trace by writing a second trace data to said trace address.

8. The computer system of claim 7, wherein said determining means further comprises leaving said first trace address equal to said first virtual address when said device driver does not exist.

9. The computer system of claim 7, wherein said device driver further comprises:

means for receiving a first physical address;

means for pinning said first physical address to said second virtual address; and means for passing said second virtual address to said determining means.

10. The computer system of claim 9, further comprising:

memory mapping means, comprising:
 means for receiving said first trace data sent by said first writing means to be written to said first trace address, wherein said first trace address was set by said application program to be equal to said second virtual address; and
 means for writing said first trace data to said first physical address.

11. The computer system of claim 10, further comprising:

a logic analyzer, comprising:
 detecting means for detecting the writing of said first trace data and said second trace data to said first physical address; and
 capturing means, responsive to said detecting means, for capturing the contents of said first trace data and said second data.

12. A tracing method for execution on a computer having virtual storage addresses and physical storage addresses, comprising the machine executed steps of:

initializing a trace address equal to a first virtual address contained in a data area;

determining whether a device driver exists, wherein said device driver has the capability to convert a first physical address into a second virtual address, and wherein when said device driver exists, said determining means requests said second virtual address from said device driver and reinitializes said trace address to be equal to said second virtual address;

indicating the beginning of a first trace by writing a first trace data to said trace address; and indicating the end of said first trace by writing a second trace data to said trace address.

13. The method of claim 12, wherein said determining step further comprises leaving said trace address equal to said first virtual address when said device driver does not exist.

14. The method of claim 12, further comprising:

indicating the beginning of a second trace by writing a third trace data to said trace address; and indicating the end of said second trace by writing a fourth trace data to said trace address.

15. An tracing method for execution on a computer having virtual storage addresses and physical storage addresses, comprising the machine executed steps of:

initializing a first trace address equal to a first virtual address contained in a data area and initializing a second trace address equal to a second virtual address contained in said data area;

determining whether a device driver exists, wherein said device driver has the capability to convert a first physical address into a second virtual address and a second physical address into a third virtual address, and wherein when said device driver exists, said determining means requests said second virtual address and said third virtual address from said device driver and reinitializes said first trace address to be equal to said second virtual address and reinitializes said second trace address to be equal to said third virtual address;

indicating the beginning of a first trace by writing a first trace data to said first trace address;

indicating the end of said first trace by writing a second trace data to said first trace address;

indicating the beginning of a second trace by writing a third trace data to said second trace address; and indicating the end of said second trace by writing a fourth trace data to said second trace address.

16. The method of claim 15, wherein said determining step further comprises leaving said first trace address equal to said first virtual address and said second trace address equal to said second virtual address when said device driver does not exist.

17. The method of claim 15, further comprising:

indicating the beginning of a third trace by writing a fifth trace data to said first trace address;

indicating the end of said third trace by writing a sixth trace data to said first trace address;

indicating the beginning of a fourth trace by writing a seventh trace data to said second trace address; and indicating the end of said fourth trace by writing a eighth trace data to said second trace address.

* * * * *